Feb. 21, 1967 — R. C. ZEIDLER — 3,305,060
DISC CLUTCH WITH DRIVE LUG WEAR PLATES
Filed March 2, 1966 — 3 Sheets-Sheet 2
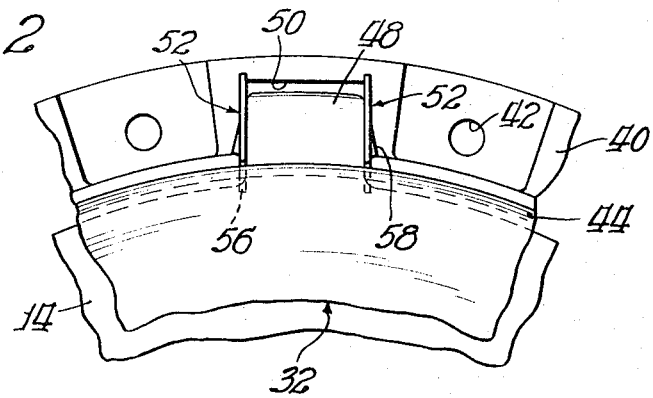
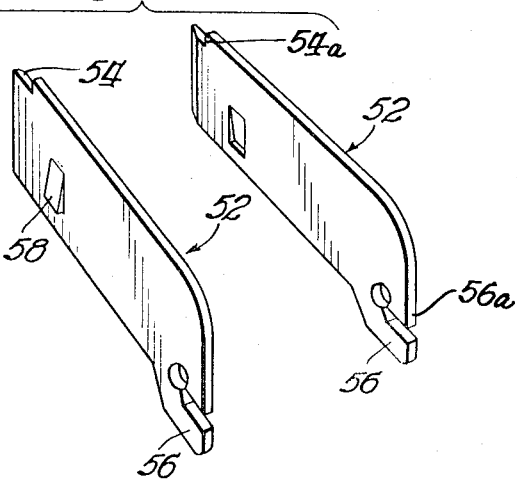
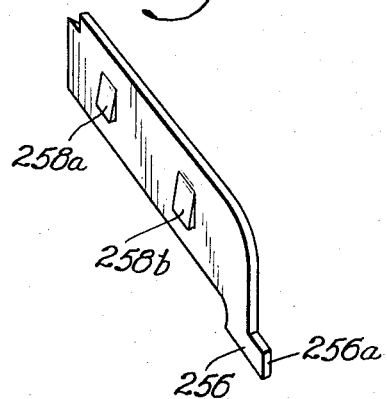
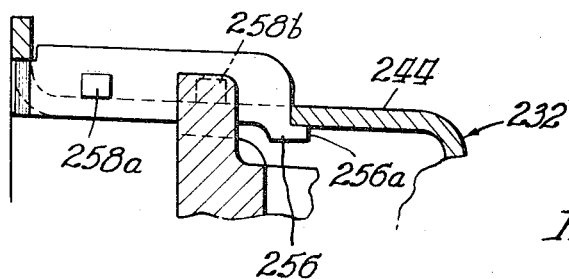
Inventor:
Reinhold C. Zeidler
By: John W. Burke, atty.

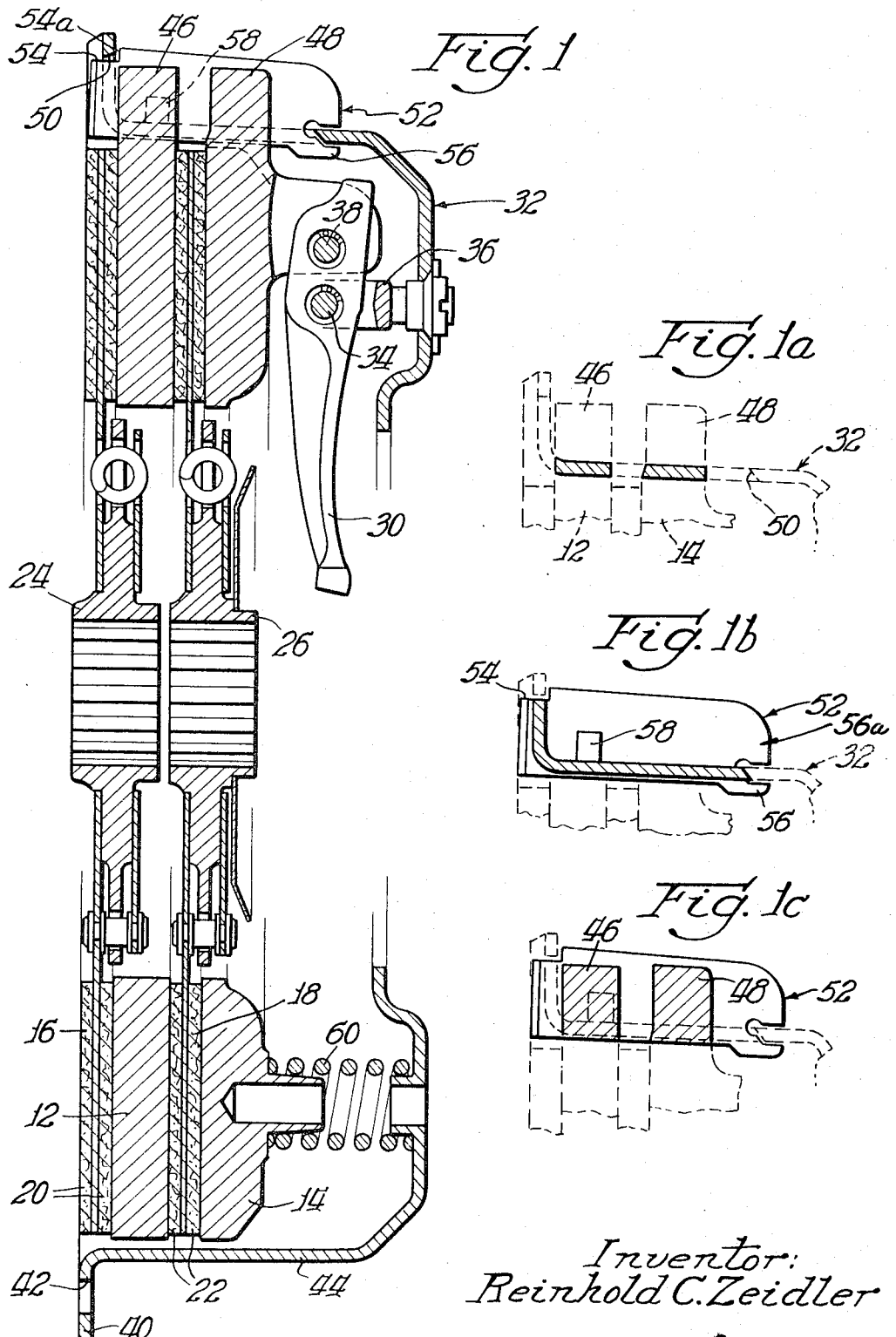

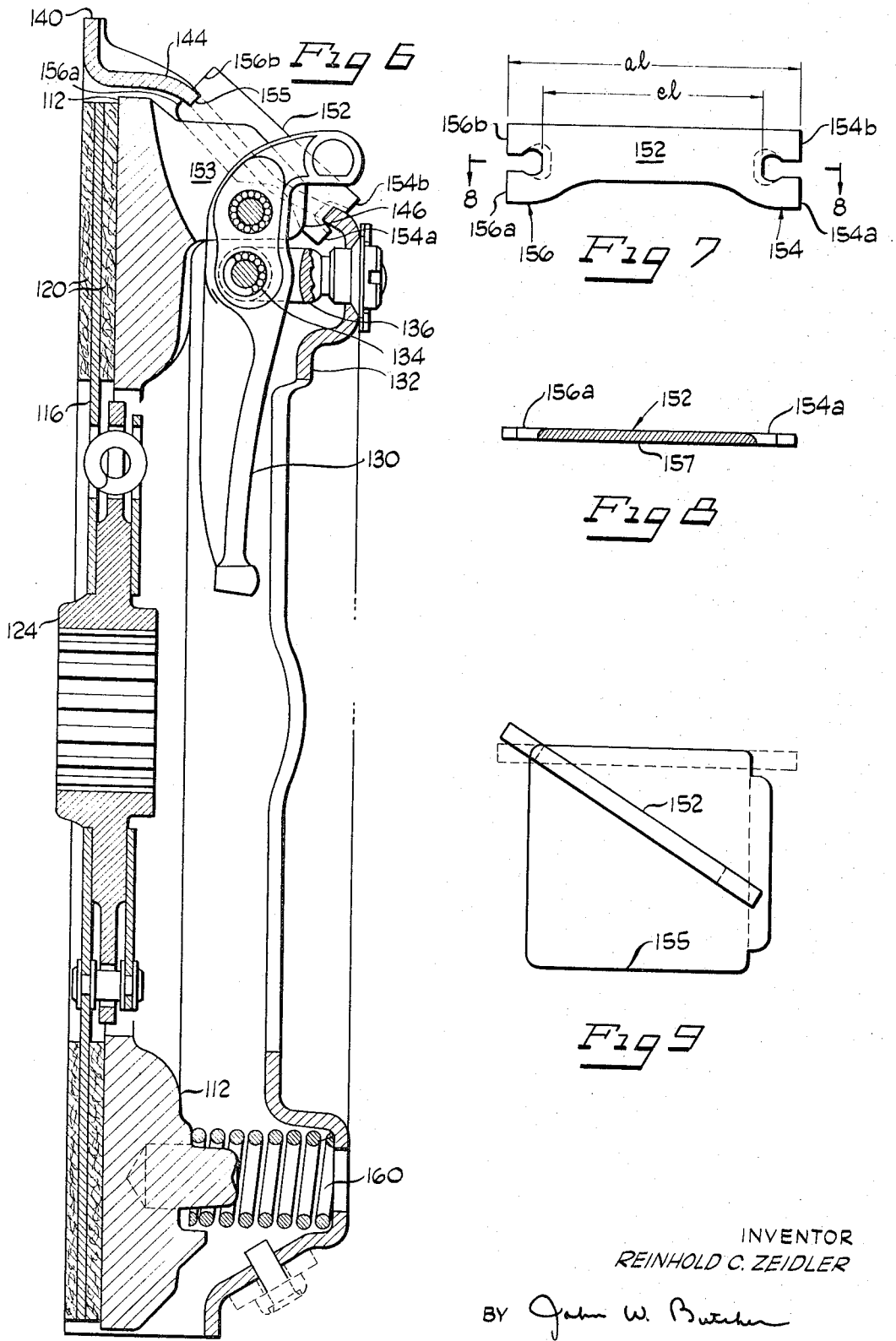

United States Patent Office 3,305,060
Patented Feb. 21, 1967

3,305,060
DISC CLUTCH WITH DRIVE LUG WEAR PLATES
Reinhold C. Zeidler, Detroit, Mich., assignor to Borg-Warner Corporation, Chicago, Ill., a corporation of Illinois
Filed Mar. 2, 1966, Ser. No. 531,120
3 Claims. (Cl. 192—69)

This application is a continuation-in-part of United States Serial No. 382,894, filed by Reinhold C. Zeidler on July 15, 1964, entitled "Drive Lug Wear Plates," and now abandoned.

This invention relates to a clutch assembly of the axially engaging type and, more particularly, to a clutch cover plate and its associated elements.

A single disc type clutch utilizes a driven member packed between the engine flywheel and pressure ring (pressure plate). This type clutch normally includes a cover plate having an axial dimension sufficient to extend from the flywheel a distance sufficient to accommodate the driven member and pressure ring.

A multiple disc type clutch utilizes a first driven member packed between the engine flywheel and a first pressure ring and a second driven member packed between the first pressure ring and a second pressure ring (pressure plate). A multiple disc clutch requires a cover plate with an axial dimension sufficient to accommodate the two driven members and two pressure rings.

It is a normal practice with single or multiple disc clutches to form a plurality of radially extending drive lugs on the periphery of the pressure rings. The clutch cover plate is formed with an inside diameter slightly larger than the outside diameter of the pressure rings. The axially extending portion of the cover plate is provided with axially extending slots each of which has a circumferential width slightly in excess of the circumferential width of the drive lugs. Thus, the slots in the cover plate in combination with the drive lugs provide a means to transfer torque loads between the cover plate and the pressure rings.

Cover plates for multiple disc clutches may be formed as an integral casting, as a shallow-drawn metal stamping (the axial dimension thereof not sufficient to encompass all the pressure rings and all the driven members as illustrated in U.S. Patent 2,036,005, Wemp), or as a deep-drawn metal stamping (the axial dimension thereof sufficient to encompass all the pressure rings and all the driven members). It is common practice to use a metal stamping as the cover plate for either a single or multiple disc clutch.

It has been found that the deep-drawn metal stamping is the most desirable type of clutch cover plate for economy, strength and space reasons. However, when used with modern high power diesel engines, it is subject to strong torsional impulses. The material used in stamping the cover plate, of necessity, is ductile, soft, and inclined to wear. High torsional impulses may result in the drive lugs hammering against the relatively soft cover plate and may cause wear of the cover plate. Wear of the cover plate is undesirable in that it tends to increase the clearance between the engaging members and this, in turn, results in generation of objectional noises. This hammering action may ultimately lead to premature failure of certain of the clutch elements.

Briefly described, this invention relates to a deep-drawn sheet metal stamping suitable for use as a cover plate for single or multiple disc clutches. The cover plate includes drive lug recesses formed therein, which recesses are adapted to engage and drive pressure ring drive lugs. A wear plate formed from a tough high-carbon steel material is interposed between the drive lugs and the cover plate to distribute the load as it is transmitted between the cover plate and the drive lugs. The wear plates are placed in the drive lug recesses on opposite sides of the drive lugs as the clutch is being assembled. Once the clutch is assembled, the wear plates are maintained in an operative position between the drive lugs and the cover plate.

Other features, objects, and advantages of the invention will appear from the following detailed description of a preferred embodiment of the invention, in which:

FIGURE 1 is a side view, partially in cross-section, of a multiple disc clutch with a wear plate positioned between the pressure ring drive lugs and the cover plate;

FIGURE 1a is a schematic illustration of the effective contact area between the drive lugs and the cover plate;

FIGURE 1b is a schematic illustration of the effective contact area between a wear plate and the cover plate;

FIGURE 1c is a schematic illustration of the effective contact area between the wear plate and the drive lugs;

FIGURE 2 is a partial end view of one set of the wear plates positioned between the drive lugs and the cover plate;

FIGURE 3 is a perspective view of a set of drive lug wear plates;

FIGURE 4 is a partial side view, partially in cross-section, of an alternate embodiment of the invention;

FIGURE 5 is a perspective view of the alternative embodiment of wear plates shown in FIGURE 4;

FIGURE 6 is a side view, partially in cross-section, of a single disc clutch with a wear plate positioned between the pressure ring drive lugs and the cover plate;

FIGURE 7 is a side view of the drive lug wear plate illustrated in FIGURE 6;

FIGURE 8 is a view, partially in cross-section, taken generally along lines 8—8 of FIGURE 7; and FIGURE 9 is a schematic view of the aperture or drive lug recess formed in the cover plate for receipt of the pressure ring drive lugs.

Referring now to the drawing, and more particularly FIGURE 1, the driving member of the clutch may comprise an engine flywheel (not shown), a first pressure ring 12, and a second pressure ring 14. A first driven disc 16 is positioned intermediate the flywheel and the first pressure ring 12. A second driven disc 18 is positioned intermediate the first pressure ring 12 and the second pressure ring 14. The first driven disc 16 is provided with a first friction facing material 20 and the second driven disc 18 is provided with a second facing material 22. The first driven disc 16 includes a hub 24 and the second driven disc includes a hub 26. Hubs 24 and 26 are mounted on a driven shaft (not shown) by way of a splined connection such that the hubs 24 and 26 are free to move axially with respect to each other and with respect to the driven shaft and such that the hubs 24 and 26 provide a means to rotate the driven shaft.

Clutch release levers 30 are pivoted at pivots 34 which pivots 34 are formed on studs 36. The studs 36 are connected to the cover plate 32. The second pressure ring or pressure plate 14 is connected to the clutch release levers by pressure plate pivot 38. A conventional clutch release bearing (not shown) is mounted to shift axially with respect to the inner terminal ends of the clutch release levers to actuate the clutch release levers. The pressure springs 60 extend between the cover plate and the second pressure ring and provide a means to engage the clutch.

The clutch cover plate of the present invention is preferably stamped from a sheet metal blank and includes a radial flange 40 which is provided with apertures 42 suitable for receipt of studs (not shown) for attaching the cover plate to the driving member. The cover plate 32 includes an axially extending portion 44 which has a dimension sufficient to encompass both driven members and both pressure rings. The first pressure ring 12 includes drive lugs 46 and the second pressure ring 14 includes drive lugs 48. The flange portion 40 and axially extending portion 44 of the cover plate 32 are provided with slots 50 to accommodate the radially extending lugs 46 and 48.

Drive lug wear plates 52 are provided between the drive lugs 46 and 48 and the cover plate 32. Each of the wear plates includes a first portion 54 which extends axially forwardly toward the driving member past the radially extending flange 40. This first portion 54 interlocks with the slot 50 in the radially extending flange 40. Each drive lug wear plate 52 includes second portions 56 and 56a which extend axially rearwardly beyond the end of the slot 50 and interlock with the axially extending portion 44 of the cover plate 32. The drive lug wear plate includes a tab 58 struck from the body thereof which engages the edge of the slot 50.

The drive lug wear plates are held against the side of the slot 50 by the drive lugs 46 and 48. The first portion 54 and the second portion 56a interlock with the cover plate to restrict radial outward movement of the wear plate with respect to the cover plate. The tabs 58 and second portion 56a engage the cover plate to restrict radial inward movement of the wear plate with respect to the cover plate. The drive lug wear plates are formed from a relatively hard material and when positioned between the drive lugs and the cover plate, are effective to distribute the load to decrease unit area loading on the cover plate as well as the drive lugs.

A clutch cover plate/drive lug assembly without wear plates has an effective engagement area equal to the width of the slot in the cover plate times the length of the slot in engagement with the drive lugs (see the cross-hatched area of FIGURE 1a).

The effective engagement area is increased a substantial amount by use of the wear plates between the cover plate and the drive lugs. This, in turn, decreases the unit area load on the cover plate as well as on the drive lugs. This is illustrated by comparing FIGURE 1b and FIGURE 1c with FIGURE 1a. The cross-hatched area of FIGURE 1b represents the effective engagement area between the wear plates and the cover plate and the cross-hatched area of FIGURE 1c represents the effective engagement area between the drive lugs and the wear plates.

The drive lug wear plates are maintained in an operative position by the configuration of the wear plates, the configuration of the cover plate, as well as the spacing between the cover plate and the drive lugs. The disclosed configuration provides means to prevent radial inward movement, radial outward movement and axial movement of the drive lug wear plates with respect to the cover plate. In the embodiment illustrated in FIGURES 1, 2 and 3, radial inward movement is restricted by tabs 58 engaging the cover plate and second portion 56a interlocking with the cover plate; radial outward movement is restricted by first portion 54 and second portion 56 interlocking with the cover plate; and axial movement is restricted by shoulder 54a engaging flange 40.

The embodiment illustrated in FIGURES 4 and 5 includes tabs 258a and 258b. The second portion 256 is provided with a tongue 256a which interlocks with the axially extending portion 244 of the cover plate 232 (FIGURE 4).

Referring to FIGURE 6, a single plate clutch may comprise an engine flywheel (not shown). A driven disc 116 is packed between the flywheel and pressure ring 112. The driven disc 116 is provided with a facing material 120 and includes a hub 124 which is adapted to be mounted on a driven shaft (not shown) by way of a splined connection such that the hub 124 is free to shift axially with respect to the driven shaft in a manner well known to those skilled in the art.

Clutch release levers 130 are pivoted at pivots 134 which pivots 134 are provided on studs 136. The studs 136 are connected to the cover plate 132. A conventional clutch release bearing (not shown) may be mounted to shift axially with respect to the inner terminal ends of the clutch release levers to actuate same and thus disengage the clutch. Pressure springs 160 extend between the cover plate and the pressure ring to provide a means to engage the clutch.

The clutch cover plate of the present invention is preferably stamped from a sheet metal blank and includes a radial flange 140 which is provided with apertures (not shown) suitable for receipt of studs for attaching the cover plate to the driving member. The cover plate 132 includes an axially extending portion 144 which has a dimension sufficient to encompass the driven member and pressure ring. The pressure ring 112 includes a drive lug 146 which extends through an aperture or drive lug recess 155 in the cover plate.

Drive lug wear plates 152 are provided between the side edge of the drive lugs 146 and the cover plate 132. Each of the wear plates 152 includes a first portion 154 which, as illustrated in FIGURE 7, is of a generally C-shaped configuration. Fingers 154a and 154b of the first portion 154 extend on opposite sides of the cover plate 132 to provide an interlocking fit with the cover plate. The drive lug wear plate 152 also include a second portion 156 which, as illustrated in FIGURE 7 are also of a generally C-shaped configuration. Fingers 156a and 156b of the second portion 156 extend on opposite sides of the cover plate to provide an interlocking fit with the cover plate.

The effective length "el" (see FIGURE 7) of the drive lug wear plates 152 is substantially identical with the length of the drive lug recesses 155 formed in the cover plate 132. The actual length "al" of the drive lug wear plates 152 is sufficient to provide fingers 154a, 154b, 156a, 156b in the first and second portions 154 and 156 respectively. These fingers 154a, 154b, 156a, 156b in part provide the means for holding the drive lug wear plates 152 in operative position.

The drive lug wear plates 152, being of a greater actual length than the aperture 155 (see FIGURE 9) are installed in the cover plate 132 prior to the time the drive lugs 146 of the pressure ring 112 are positioned in the drive lug recesses 155. Each of the drive lug wear plates 152 is placed in the aperture 155 in a diagonal position as illustrated by the solid line in FIGURE 9 such that one end portion is fitted with respect to the clutch cover plate 132. The drive lug wear plates 152 may be moved to their operative position (see the dotted lines of FIGURE 9). Two drive lug wear plates 152 are used in each of the drive lug recesses 155 and the clutch is then assembled such that the drive lugs 146 are positioned in the aperture 155 between the drive lug wear plates 152.

The means used to maintain the drive lug wear plates 152 in operative position includes the two C-shaped end portions 154 and 156 on opposite ends of each drive lug wear plate 152 in combination with the driving surface 153 of the drive lug 146 bearing against the side portion 157 of the drive lug wear plates 152.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. A clutch assembly including a driving member, a cover plate connected to said driving member and formed of a deep drawn metal stamping; a plurality of slots formed in said cover plate, a driven member disposed within said cover plate; a pressure ring mounted within said cover plate adapted to shift axially with respect to said cover plate, said driving member, and said driven member to cause engagement and disengagement of said driving member and said pressure ring with said driven member, said pressure ring having a plurality of radially extending drive lugs disposed on the perimeter thereof, said drive lugs having driving surfaces thereon extending through said plurality of slots, and plurality of drive lug wear plates one of which is interposed between each of said driving surfaces of said radially extending lugs and said cover plate, each said drive lug wear plate including, a first end portion, a second end portion disposed opposite said first end portion, a first side and a second side opposite said first side each said sides being defined by a radially inner and a radially outer edge extending between said end portions, one of said end portions including a notch engaging said cover plate and the other of said end portions being of generally C-shaped configuration and engaging said cover plate.

2. A clutch assembly including a driving member, a cover plate engaged to said driving member and formed of a deep drawn metal stamping; a plurality of slots formed in said cover plate; a driven member disposed within said cover plate; a pressure ring mounted within said cover plate adapted to shift axially with respect to said cover plate, said driving member, and said driven member to cause engagement and disengagement of said driving member and said pressure ring with said driven member, said pressure ring having a plurality of radially extending drive lugs disposed on the perimeter thereof, said drive lugs having driving surfaces thereon extending through said plurality of slots, and plurality of drive lug wear plates one of which is interposed between each of said driving surfaces of said radially extending lugs, and said cover plate; each said drive lug wear plates including, a first end portion, a second end portion disposed opposite said first end portion, a first side and a second side opposite said first side each said sides being defined by a radially inner and a radially outer edge extending between said end portions, said first end portion of said drive lug wear plate being of generally C-shaped configuration and said second end portion of said drive lug wear plate being of generally C-shaped configuration each of said end portions engaging said cover plate.

3. A clutch assembly including a driving member, a cover plate engaged to said driving member and formed of a deep drawn metal stamping; a plurality of slots formed in said cover plate, a driven member disposed within said cover plate; a pressure ring mounted within said cover plate adapted to shift axially with respect to said cover plate, said driving member, and said driven member to cause engagement and disengagement of said driving member and said pressure ring with said driven member, said pressure ring having a plurality of radially extending drive lugs disposed on the perimeter thereof, said drive lugs having driving surfaces thereon extending through said plurality of slots, and plurality of drive lug wear plates one of which is interposed between each of said driving surfaces of said radially extending lugs and said cover plate; each said drive lug wear plate including a first end portion, a second end portion disposed opposite said first end portion, a first side and a second side opposite said first side each said sides being defined by a radially inner and a radially outer edge extending between said end portions, said drive lug wear plates including tabs stuck out of said first side portion intermediate said radially inner and said radially outer edge, said tabs being disposed to engage said cover plate to prevent radial inward movement of said drive lug wear plate with respect to said cover plate.

References Cited by the Examiner

UNITED STATES PATENTS

| | | | |
|---|---|---|---|
| 1,017,762 | 2/1912 | Jones | 192—69 |
| 1,683,806 | 9/1928 | Richards | 192—69 |
| 2,720,958 | 10/1955 | Lysett | 192—68 X |
| 3,090,475 | 5/1963 | Gatewood et al. | 192—99 |
| 3,191,735 | 6/1965 | Wavak | 192—110 |

DAVID J. WILLIAMOWSKY, *Primary Examiner.*
BENJAMIN W. WYCHE, III, *Examiner.*